United States Patent Office 2,859,043
Patented Nov. 4, 1958

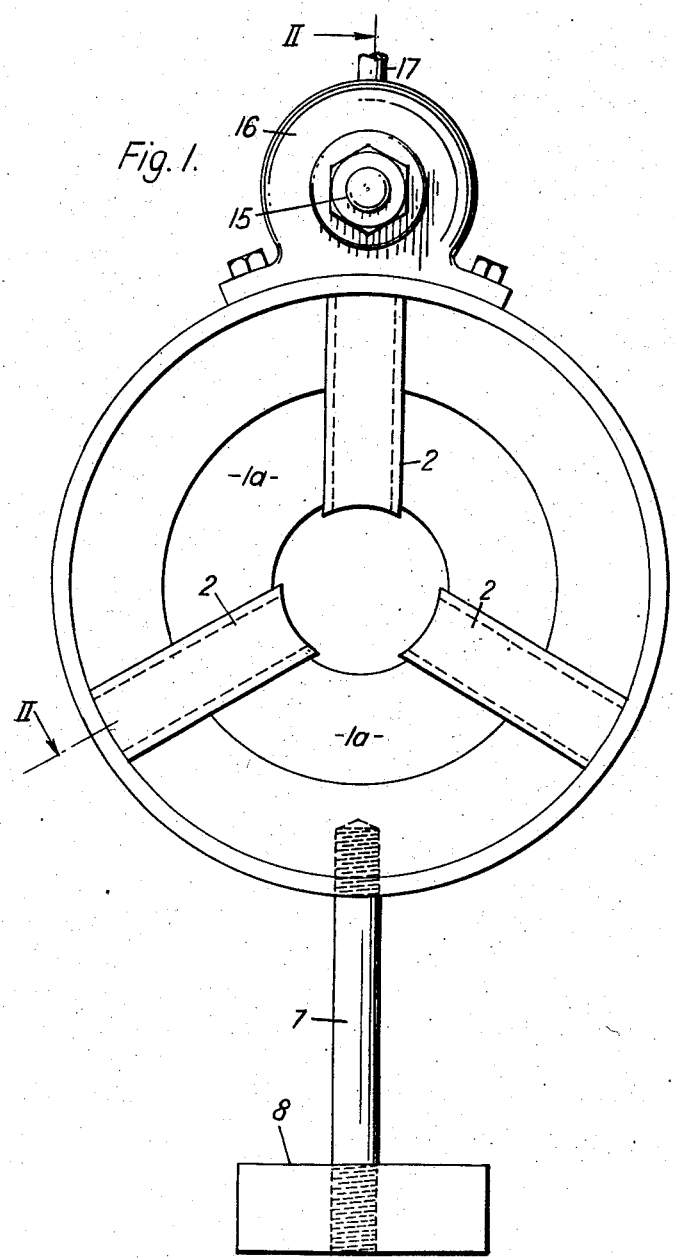

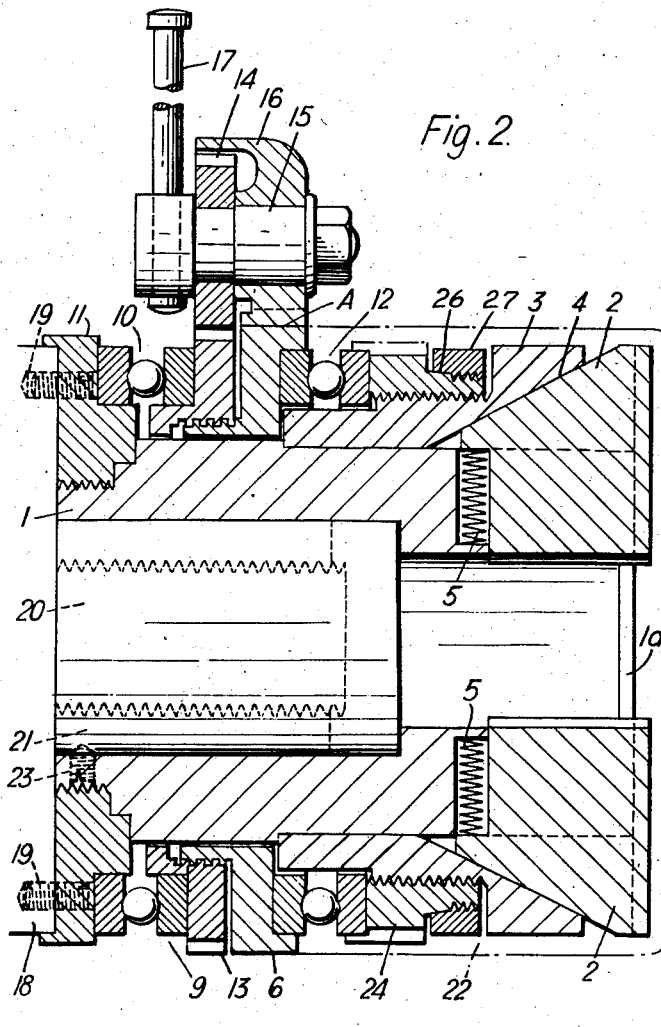

2,859,043

CHUCK WITH JAWS ACTUATED BY EXTERNAL CONE MEMBERS

James Edward Connor, Wolverhampton, England

Application June 7, 1956, Serial No. 589,993

2 Claims. (Cl. 279—122)

This invention relates to chucks for lathes and the like of the type in which radial jaws are contracted on the "work" by means of a coned sleeve and it has for its object improved means for operating the coned sleeve by means of toothed gearing, so that a work-piece can be clamped in the chuck with a minimum of effort and so that the chuck can be opened and closed whilst the chuck is rotating. A still further object is to adjust the chuck according to the size of the work-piece to be gripped to ensure a minimum of movement of the gearing to effect the movement from the fully opened position to the gripping position.

Referring to the drawings:

Figure 1 is a front view of a chuck constructed according to this invention, and Figure 2 is a section on line II—II of Figure 1, the lower part of the section below the centre line of the chuck being shown in the central plane of the chuck.

According to a convenient embodiment of this invention, the chuck comprises a body 1 in radial groove of which jaws 2 are slidably mounted. The jaws are held in position by a front plate 1a formed in three sectors, the sides of which engage grooves in the sides of the jaws 2. A sleeve 3 having a cone shaped bore 4 is slidably mounted on the body 1 and is adapted when slid outwardly to press the jaws 2 inwardly into the gripping position, and when the coned sleeve 3 is moved inwardly, the jaws 2 are pressed outwardly by the springs 5. The coned sleeve 3 is pressed outwardly by means of an expanding means A which comprises an externally screw threaded sleeve 6 which is held against rotation on the body 1 by means of a pin or projection 7 on the sleeve which slidably engages the machine frame. The pin 7 may have a block 8 thereon which engages a slot in the machine frame. An internally screwed ring 9 is mounted on the screwed sleeve and means are provided to rotate the ring. The ring 9 bears against a thrust bearing 10 which itself bears against an abutment ring 11 fixed on the chuck body 1. The externally screwed sleeve 6 bears against a thrust bearing 12 interposed between such sleeve and the coned sleeve 3. When the ring 9 is rotated in one direction, the sleeve 6 moves axially and presses the coned sleeve 3 outwardly through the intermediary of the thrust bearing 12. It is a feature of the invention, that the axial thrust operating the jaws 2 is taken entirely by the body of the chuck through the abutment ring 11 and therefore no thrust is transmitted to the means fixing the chuck in position on the lathe or the like. The ring 9 is conveniently rotated by gearing and the ring 9 has teeth 13 on the periphery which are engaged by a toothed wheel 14 on a spindle 15 mounted in a bracket 16 fixed on the sleeve 6, the spindle 15 being rotated by a tommy bar 17. The cone ring 3 has a screwed ring 24 thereon which forms an adjustable abutment against which the thrust bearing 12 bears and by adjusting the screwed ring on the coned ring 3, the initial expanded position of the jaws can be set, thereby providing for various sizes of work pieces to be gripped with a minium of opening and closing movement of the jaws 3. The screwed ring 24 has a nose 25 which has a conical portion 26 and which is split so that by tightening the nut 27, the nose can be clamped on the coned ring 3.

As all the thrust for operating the jaws of the chuck is taken by the body of the chuck, the chuck can be fixed on the machine in a simple manner and therefore can be readily fitted on any machine. The chuck can for instance be fixed on a capstan lathe flange 18 by means of screws 19 which pass through the ring 11. Again the body of the chuck can be fixed on the nose 20 of a lathe by the use of an adaptor 21 fixed to the body 1 by screw 23.

The chuck can be enclosed in a cylindrical guard 22 which is fixed to the sleeve 6 and as the sleeve 6 does not rotate the guard 22 will not rotate.

The jaws 2 can be operated whilst the chuck is rotating. The chuck according to the invention, obviates the use of collets and enables larger diameter of bars to be operated on as a collet operating tube is not present inside the lathe spindle.

The jaws 2 can be readily removed and other jaws fitted and hard or soft jaws can be used and the jaws may be adapted to operate internally or externally.

The expanding means for operating the cone sleeve can be varied, and compressed air may be used for this purpose.

Having thus described the invention, what is claimed as new and desired to be secured by Letters Patent, is:

1. A chuck for lathes comprising a chuck body, a coned sleeve axially slidable on the chuck body to operate the chuck into the gripping position, a thrust bearing mounted co-axial with said body and located against an abutment on the chuck body, a thrust bearing movable co-axial of said body and located against the coned sleeve, axially expanding means between said thrust bearings for axially moving the coned sleeve for operating the clutch into the gripping position comprising an externally screwed sleeve in which the chuck body rotates, a projection on said latter sleeve slidably anchored in relation to the machine frame to allow axial movement of said latter sleeve but to prevent rotational movement, said latter sleeve bearing against said axially movable thrust bearing, a bracket on said externally screwed sleeve and a toothed gear wheel mounted on the radial projection, an internally screwed ring rotatably mounted about the axis of the chuck body and engaging the said externally screwed sleeve and bearing against said first mentioned thrust bearing so that when said ring is rotated the thrust bearings are axially moved apart, a ring of teeth on said internally screwed sleeve which is in engagement with said toothed wheel, and means for rotating the latter toothed wheel to open and close the chuck.

2. A chuck for lathes comprising a chuck body, gripping jaws slidably mounted in radial grooves in the chuck body, a coned sleeve axially slidable on the chuck body to move the gripping jaws into the gripping position, a first thrust bearing mounted co-axial with said body and located against an abutment fixed on the chuck body, a second thrust bearing co-axial with said body and slidably mounted axially of said body, a screwed ring mounted on said coned sleeve adjustable lengthways on said coned sleeve to adjust the position of the coned sleeve according to the size of a work-piece to be held in the clutch and said coned sleeve forming an abutment against which said second thrust bearing is located, axially expanding means between said thrust bearings for axially moving the coned sleeve for moving the said jaws into the gripping position comprising an externally screwed sleeve in which the chuck body rotates, a projection on said latter sleeve slidably anchored in relation to the machine frame to allow axial movement of said latter sleeve but to prevent rotational movement, said latter sleeve bearing against said slidably mounted thrust bearing, a bracket on said externally screwed sleeve and a toothed gear wheel mounted on the bracket, an internally screwed ring rotatably mounted about the axis of the chuck body and engaging the said externally screwed sleeve and bearing against said first mentioned thrust bearing so that when said ring is rotated the thrust bearings are axially moved apart, a ring of teeth on said internally screwed sleeve which is in engagement with said toothed wheel, and means for rotating the latter toothed wheel to open and close the chuck.

References Cited in the file of this patent

FOREIGN PATENTS 135,618   Australia _____ Dec. 5, 1944